UNITED STATES PATENT OFFICE.

ELWOOD GOSSETT, OF LOS ANGELES, CALIFORNIA.

ARTIFICIAL STONE.

1,135,176.     Specification of Letters Patent.     Patented Apr. 13, 1915.

No Drawing.     Application filed January 5, 1914. Serial No. 810,425.

*To all whom it may concern:*

Be it known that I, ELWOOD GOSSETT, a citizen of the United States, residing at Los Angeles, in the county of Los Angeles and State of California, have invented certain new and useful Improvements in Artificial Stone; and I do declare the following to be a full, clear, and exact description of the invention, such as will enable others skilled in the art to which it appertains to make and use the same.

My invention relates to artificial stone, and has for its object to provide a composition of matter, which may be prepared in a fluid state and molded into slabs, or other configuration, for use as building material or ornamental structures.

The composition comprises the following ingredients and is preferably prepared in the manner hereinafter described; viz: rock salt 16 pounds, water 2½ gallons, iron rust 6 pounds, volcanic ash 10 pounds, silica sand 20 pounds, ground asbestos 4 pounds, powdered rock 10 pounds, green vitriol 1 pound, coloring matter as required but not necessarily essential.

In preparing the composition I first dissolve the rock salt in two gallons of water, and the green vitriol in one-half gallon of water, in separate vessels. The iron rust is finely powdered or crushed to convert it into a fine powder and is thoroughly mixed with the other dry elements, comprising volcanic ash, silica sand, ground asbestos, powdered rock, and if a coloring matter is to be used, with dry color pigments; the mass of powdered material being preferably screened, after being thoroughly mixed. After the dry materials have been mixed, the salt solution is added and the mass thoroughly stirred and mixed, after which the vitriol solution is added to the mixture of dry material and the salt solution. Should the final mixture be too heavy or thick to pour, I may then add sufficient salt solution of the ratio of sixteen pounds of rock salt to two gallons of water thereto, in order to reduce the mass to the proper fluid. When the mass is thoroughly mixed and sufficiently fluid, it is poured in the molds and allowed to stand until hardened; the time required being usually from twelve to twenty-four hours. When thoroughly hardened, the composition becomes solid and very hard, and when cast in a mold having a smooth surface, a fine glossy finish is produced; the combination of the salt solution with the iron, and the intermingling of such elements with the other elements producing a bond that unites all of the elements into a hard dense substance resembling and having the properties of a hard natural stone, such as marble or granite, but which is of lighter weight, on account of the presence of the ground asbestos and volcanic ash.

It is apparent that, as the composition is eventually mixed in a fluid state, it may be poured or molded into any configuration desired, so that it may be used as a slab or veneer, or may be cast into pillars, statuary or any desired configuration, and that it may be used in its natural color, or tinted in any color desired, by the addition of color pigments.

Having thus described my invention, what I claim as new therein, and desire to secure by Letters-Patent, is:—

An artificial stone consisting of the following ingredients in substantially the proportions given: rock salt 16 pounds, iron rust 6 pounds, volcanic ash 10 pounds, silica sand 20 pounds, ground asbestos 4 pounds, powdered rock 10 pounds, green vitriol 1 pound.

In testimony whereof I affix my signature in presence of two witnesses.

ELWOOD GOSSETT.

Witnesses:
   GEO. SIMPSON,
   W. T. GOODHUE.

Copies of this patent may be obtained for five cents each, by addressing the "Commissioner of Patents, Washington, D. C."